Patented Jan. 2, 1940

2,185,533

UNITED STATES PATENT OFFICE 2,185,533

WOOD PRESERVATIVE

Karl Wolman, Berlin-Grunewald, and Richard Huber, Berlin-Wilmersdorf, Germany

No Drawing. Application July 27, 1935, Serial No. 33,620. In Germany August 3, 1934

6 Claims. (Cl. 134—78.6)

The preparation of a fluorine-containing impregnating salt mixture of high solubility in solid form has hitherto been unsuccessful owing to the deliquescence of the readily soluble fluorine salts required therefor. Such impregnating salts could therefore only be prepared in aqueous solution. It is obvious that the high costs of transport militate against the employment of such aqueous solutions.

Sodium fluoride and sodium silico fluoride are so slightly soluble in water that it is not possible to make concentrated solutions therewith.

The object of the present invention is the preparation of a transportable, readily soluble, fluorine-containing impregnating salt in powder form. For this purpose use is made of the non-hygroscopic bifluorides of potassium or ammonium, which are mixed with chromates or dichromates, if desired with the addition of other fungicidal and insecticidal substances in such a ratio with potassium carbonate (or potassium bicarbonate) that the solution of the mixture in water is in the neighbourhood of the pH value 7 or more.

Such potassium bifluoride-chromate mixtures are up to 14% soluble in water. When such solutions are used to impregnate wood, through the reducing action of the wood the chromate is reduced to chromic ions and forms with the fluoride complex double salts which are difficult to wash out.

In order to increase the insecticidal action of the wood preservative involved here, the mixture of potassium or ammonium bifluorides, potassium or ammonium chromates and if desired phenolic compounds may have a further addition of arsenic acid or arsenious acid or their acid potassium or ammonium salts, the acid property of these salts being balanced again by a corresponding addition of potassium carbonate. The salt mixtures prepared in this manner keep for some length of time in powder-dry state in the air and can be kept for an infinite length of time in sealed vessels. When dissolved in water the acid fluorine and arsenic salts react with the potassium carbonate, forming readily soluble neutral salts.

Examples

| | Parts by weight |
|---|---|
| 1. Potassium bifluoride | 38 |
| Potassium carbonate | 34 |
| Potassium dichromate | 36 |
| Dinitrophenol | 2 | are mixed.

| | Parts by weight |
|---|---|
| 2. Potassium bifluoride | 18 |
| Acid potassium arsenate | 18 |
| Potassium dichromate | 28 |
| Potassium carbonate | 34 |
| Dinitrophenol | 2 | are mixed.

These salt mixtures are used preferably in 10-14% solution for impregnating wood.

At the same time other antiseptic or fungicidal or insecticidal substances which reduce the inflammability of the wood may also be added to the new preservatives. The wood can be saturated by any desired method.

What we claim is:

1. A wood preservative consisting of a mixture of approximately the following composition: 38 parts of potassium bifluoride, 34 parts of potassium carbonate, 36 parts of potassium dichromate, and 2 parts of dinitrophenol.

2. A wood preservative consisting of a mixture of approximately the following composition: 18 parts of potassium bifluoride, 18 parts of acid potassium arsenate, 28 parts of potassium dichromate, 34 parts of potassium carbonate and 2 parts of dinitrophenol.

3. A wood preservative in solid, stable and readily soluble form and consisting essentially of an alkali metal chromate, a substance selected from the group containing ammonium bifluoride and potassium bifluoride, and a quantity of potassium carbonate which is sufficient to render the pH value of a water solution of the mixture in the neighborhood of 7.

4. A wood preservative in solid, stable and readily soluble form and consisting essentially of an alkali metal dichromate, a substance selected from the group containing ammonium bifluoride and potassium bifluoride, and a quantity of potassium carbonate which is sufficient to render the pH value of a water solution of the mixture in the neighborhood of 7.

5. A wood preservative in solid, stable and readily soluble form and consisting essentially of an alkali metal chromate, an acid arsenate of an alkali metal, a substance selected from the group containing ammonium bifluoride and potassium bifluoride, and a quantity of potassium carbonate which is sufficient to render the pH value of a water solution of the mixture in the neighborhood of 7.

6. A wood preservative in solid, stable and readily soluble form and consisting essentially of an alkali metal chromate, dinitrophenol, a substance selected from the group containing ammonium bifluoride and potassium bifluoride, and a quantity of potassium carbonate which is sufficient to render the pH value of a water solution of the mixture in the neighborhood of 7.

KARL WOLMAN.
RICHARD HUBER.